June 26, 1956     C. T. HAMMOND     2,752,184
SPRING ACTUATED LATCH DEVICE FOR DOORS AND LIKE CLOSURES
Filed July 23, 1953
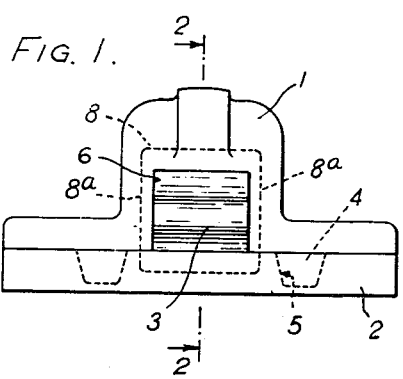
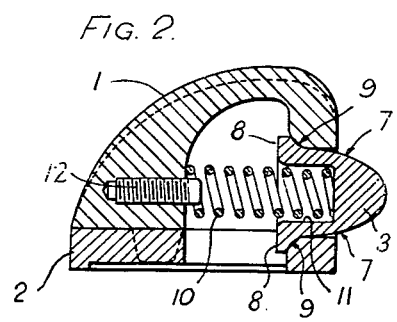
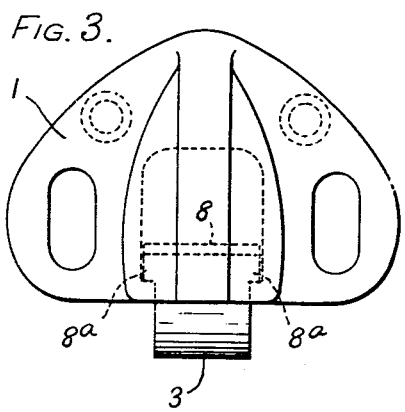
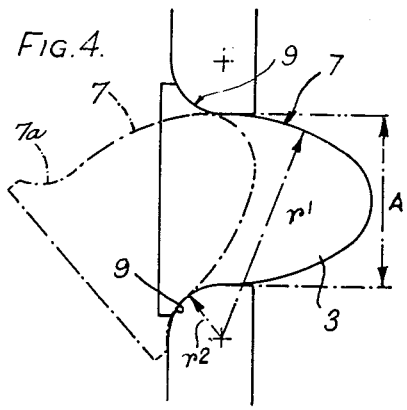
INVENTOR
C. T. HAMMOND
BY
Wilkinson & Mawhinney
ATTYS.

2,752,184

SPRING ACTUATED LATCH DEVICE FOR DOORS AND LIKE CLOSURES

Charles Thomas Hammond, Thornton Heath, England, assignor to Redwing Limited, Thornton Heath, Croydon, England, a British company Application July 23, 1953, Serial No. 369,790

6 Claims. (Cl. 292—71)

This invention relates to improvements in and relating to spring actuated latch devices for doors or like closures and more particularly to latch devices of the kind comprising a tongue which is urged outwardly through an aperture in a retaining cage to enter a recess in a catch plate when the door is in closed position, the tongue being provided with opposed curved surfaces adapted to ride over the catch plate to force the tongue inwardly of its cage as the door is moved between open and closed positions, the complete withdrawal of the tongue through the cage aperture being prevented by lateral projections or ears on the tongue abutting wall portions of the cage adjacent to the said aperture.

In known latches these lateral projections or ears form sharp angles with the body of the tongue and engage relatively sharp corners on the walls of the cage. Such an arrangement has the disadvantage that when the door or the like is closed with force a sharp blow is given to the tongue forcing it inwardly and practically the whole of this force is imparted to the angle the lateral projections make with the body of the tongue and is transmitted to the cage at angularly disposed portions of said walls. These sharp angular portions of the tongue and cage are normally relatively weak points of construction and in consequence violent impact of the door is liable to cause the projections on the tongue or adjacent parts of the cage to become broken.

It is an object of the present invention to provide an improved form of latch device which overcomes these disadvantages and therefore will have a much longer working life.

According to the present invention in a spring actuated latch of the kind referred to portions of the tongue and portions of the wall of the aperture in the cage through which the tongue projects are formed with smoothly curved surfaces of corresponding shape, whereby when the tongue is displaced by the striker plate the said curved portions of the tongue are adapted to have a smooth sliding action over the corresponding curved portions of the wall of the cage aperture.

To enable the invention to be fully understood it will now be described with reference to the accompanying drawing, in which:

Fig. 1 is a front view of a latch according to one embodiment of the invention;

Fig. 2 is a sectional view on line 2—2 of Fig. 1;

Fig. 3 is a plan view of Fig. 1; and

Fig. 4 is an enlarged view of the tongue and adjacent portions of the cage wall.

As shown in the accompanying drawing a latch device includes a main cage member 1 and a secondary cage portion or base 2 adapted to be assembled together to form a complete cage for a tongue 3. The cage part 1 is provided with studs 4 adapted to seat in recesses 5 in the secondary cage portion 2 to locate the parts in correctly assembled position.

The cage portion 1 is formed with a recess or opening 6 in one wall, the lower edge of this recess being adapted to be closed by part of the upper surface of the secondary cage member 2, the two parts thereby combining to define an aperture 6 through which the tongue 3 is adapted to project.

The tongue 3 comprises a nose having oppositely disposed sides which have smooth convexly curved surfaces indicated at 7 which merge smoothly into concavely curved surfaces 7a formed partly in the outer surface of the lateral projections or ears 8 and partly in portions of the tongue adjacent thereto. The tongue is also formed with projecting side portions 8a extending between the ears 8 and forming therewith a continuous flange to provide a relatively large area for abutment with the adjacent inner wall of the cage portions thereby serving to increase the useful life of the parts.

Wall portions of the cage parts which define the upper and lower sides of the aperture 6 are also smoothly curved as indicated at 9, the curvature being complementary to the curved surfaces 7 and 7a of the tongue. It will be understood that in operation the curved surfaces 7 and 7a will make smooth sliding engagement with the curved surfaces 9 of the cage walls.

The tongue 3 is normally urged into the position shown in the drawing by a spring 10 mounted inside the cage and engaging in a recess 11 in the rear face of the tongue, the spring being located by a screw stud 12.

In operation when the door is moved from open to closed position one of the curved side walls 7 of the tongue will be engaged by the striker plate mounted on the door frame, whereby the tongue will be moved laterally and inwardly of the cage as it rides over the striker plate, and it will be noted that when it is displaced in this manner the curved surfaces 7 and 7a of the tongue will have a smooth sliding action over the corresponding curved wall portions 9 of the cage whereby the impact will be distributed over a relatively large area thereby eliminating the possibilty of the full load being imparted to only one point, and the danger of fracture is thus avoided. When the door is moved to open poistion the opposite of the curved side walls 7 will be engaged by the striker plate but the tongue will have a similar smooth sliding action as when the door is closed.

As shown in Fig. 4 the radius $r^1$ of the curved surfaces of the tongue is taken from the same centre as the radius $r^2$ of the co-operating curved surfaces 9 of the cage walls, the radius $r^1$ being equal to or slightly less than the radius $r^2$ plus the width A of the cage opening. The radius of the nose of the tongue is such as to provide a sufficient length of nose to ensure efficient contact with the latch plate and when actuated by the latter to be fully deflected into the cage as indicated in dot dash lines in Fig. 4.

The tongue, cage and other parts of the latch may be formed of polyamide fibre or other suitable moulded plastic such as nylon.

I claim:

1. Latch mechanism for a closure member including a casing having an aperture, a latch tongue mounted in said casing and having a nose portion projecting through said aperture, resilient supporting means for said tongue permitting movement of said tongue relatively to said aperture, said tongue having oppositely disposed smoothly curved surfaces and said aperture having oppositely disposed wall portions having a smooth curvature complementary to the said curved surfaces of the tongue to form bearing surfaces over which the said surfaces of the tongue will make smooth sliding engagement on movement of the tongue relative to said aperture.

2. Latch mechanism for a closure member including a casing having an aperture, a latch tongue mounted in said casing and having a nose portion projecting through said aperture, resilient supporting means for said tongue permitting movement of said tongue relatively to said aperture, said tongue having oppositely disposed smoothly curved surfaces including a concavely curved portion and said aperture having oppositely disposed wall portions having a smooth convex curvature complementary to the said concavely curved portions of the surfaces of the tongue, the curved surface of said walls forming bearing surfaces over which the said surfaces of the tongue will make smooth sliding engagement on movement of the tongue relative to said aperture.

3. Latch mechanism for a closure member including a casing having an aperture, a latch tongue mounted in said casing and having a nose portion projecting through said aperture, and laterally projecting portions at the base of said nose, resilient supporting means for said tongue permitting movement of said tongue relatively to said aperture, said nose having oppositely disposed smoothly curved convex surfaces and said projections having concavely curved surfaces merging into the curved surfaces of the nose, said aperture having oppositely disposed wall portions each having a smoothly curved surface to form a bearing surface over which the said surfaces of the tongue will make smooth sliding engagement on movement of the tongue relative to said aperture.

4. Latch mechanism as claimed in claim 3 wherein each of said convexly curved surfaces of the nose has a radius equal to or slightly less than the sum of the radius of the convexly curved surface of one of said wall portions and the width of said aperture as defined by said oppositely disposed wall portions.

5. Latch mechanism for a closure member including a casing having an aperture, a latch tongue mounted in said casing and having a nose portion projecting through said aperture, and laterally projecting portions at the base of said nose, resilient supporting means for said tongue permitting movement of said tongue relatively to said aperture, said nose having oppositely disposed convexly curved surfaces and said projections having concavely curved surfaces merging into the said convexly curved surfaces of the nose, and said aperture having oppositely disposed wall portions each said wall portion having an inner edge formed with a smooth convexly curved surface to form a bearing surface over which the adjacent curved surfaces of the nose and projections will make smooth sliding engagement on movement of the tongue relative to said aperture.

6. Latch mechanism for a closure member including a moulded casing made of plastic material and having an aperture, a latch tongue moulded from plastic material mounted in said casing and having a nose portion projecting through said aperture and laterally projecting portions at the base of said nose, resilient supporting means for said tongue permitting movement of said tongue relatively to said aperture, said nose being moulded to provide oppositely disposed smoothly curved surfaces and said projections being moulded to provide concavely curved surfaces merging into said convexly curved surfaces of the nose, oppositely disposed wall portions of the casing which define part of the said aperture being moulded to provide smoothly curved convex surfaces forming bearing surfaces over which the said curved surfaces of the nose and lateral projections make smooth sliding engagement on movement of the tongue relative to said aperture.

References Cited in the file of this patent

UNITED STATES PATENTS

| | | |
|---|---|---|
| 1,244,443 | Hurd | Oct. 23, 1917 |

FOREIGN PATENTS

| | | |
|---|---|---|
| 1,777 | Great Britain | 1885 |
| 18,968 | Great Britain | 1902 |